United States Patent [19]

Moulin et al.

[11] 4,135,990

[45] Jan. 23, 1979

[54] SURFACE TREATMENT OF THE ANODES FOR TANTALUM CAPACITORS

[75] Inventors: Michéle Moulin; Balint Escher; Dominique Prince; Jean Vasseux, all of Paris, France

[73] Assignee: Societe Lignes Telegraphiques et Telephoniques, Paris, France

[21] Appl. No.: 866,714

[22] Filed: Jan. 3, 1978

[30] Foreign Application Priority Data

Jan. 7, 1977 [FR] France .................................. 77 00329
Aug. 4, 1977 [FR] France .................................. 77 23982

[51] Int. Cl.² ............................................. C25D 11/26
[52] U.S. Cl. ................................. 204/32 R; 204/35 N; 204/42
[58] Field of Search .................... 204/42, 35 N, 32 R; 29/570; 361/436, 322

[56] References Cited

U.S. PATENT DOCUMENTS 2,989,447  6/1961  Power ...................................... 204/42
3,079,536  2/1963  McLean .............................. 204/42 X Primary Examiner—G. L. Kaplan
Attorney, Agent, or Firm—Carroll F. Palmer

[57] ABSTRACT

The anodization of sintered anodes for tantalum capacitors is carried out in two successive steps separated by a cleaning step in an acid bath. In a preferred variant of the process both the first anodization and the cleaning are performed on batches of anodes which are individually sorted and mounted on current carrying bars before the second anodization step. The direct leakage current of capacitors made from anodes anodized according to the invention is substantially lower than that of capacitors with prior art anodes. The capacitors are also less sensitive to temperature.

8 Claims, 8 Drawing Figures

TESTS

SURFACE TREATMENT OF THE ANODES FOR TANTALUM CAPACITORS

BACKGROUND OF THE INVENTION

The present invention relates to an improvement in the manufacture of tantalum solid electrolyte capacitors and is concerned more particularly with the step of the oxidation of the anodes. It is necessary to recall here the principal steps of manufacture of tantalum capacitors as described in the U.S. Pat. No. 3,166,693 to Haring and Taylor.

The anode is essentially produced from tantalum powder of well defined grain size by pressing followed by sintering at temperatures depending upon the performances of the capacitor to be obtained, these temperatures being in the neighbourhood of 1800° C. By means of this metallurgical treatment, it is possible to obtain a porous anodic structure which is thereafter subjected to a surface anodic oxidation for the purpose of forming, over the whole of the surface of the anodic sponge, a layer of tantalum oxide which performs the function of the dielectric of the capacitor. The oxidized anodic structure is thereafter covered by a layer of manganese dioxide obtained by impregnating the porous structure with a manganese salt solution which is decomposable into dioxide by pyrolysis. The pyrolysis operation sometimes causes a deterioration in the oxide layer which must be subsequently reformed. In order to obtain a dioxide layer of sufficient thickness, it is also customary to proceed with a number of successive impregnations followed by pyrolyses and reformations. There then follows the formation of the cathode of the capacitor by deposition of one or more conductive layers upon the anodic structure thus obtained. The capacitor is finished by an encapsulating step.

BRIEF SUMMARY OF THE INVENTION

According to the present invention concerning the steps of the anodic oxidation of the anode, the anodic oxidation and more precisely the first anodic oxidation is carried out in two successive steps separated by a step in which the partially oxidized structures are cleaned in acid medium. A preferred variant of the invention is characterized by the following points:

the first oxidation (or pre-oxidation) and the succeeding acid washing are carried out on the anodes in batch;

the first oxidation is so carried out that the oxidation voltage and the oxidation current reach a value in the neighbourhood of their maximum values;

the second oxidation is carried out at a voltage in the neighbourhood of the value of the maximum voltage reached in the course of the first oxidation;

a step for sorting the individual anodes is carried out between the acid cleaning and the second oxidation.

This anodic oxidizing process carried out in two steps separated by a cleaning phase makes it possible to reduce considerably the leakage currents of the capacitors. Another advantage of the invention resides in a reduction of the leakage current variations as a function of temperature. It is difficult to explain the physical reasons for the improvement in performance which is brought about by the treatment according to the invention. However, it may be assumed that the cleaning in acid medium effects a levelling of the micro roughness present on the surface of the spongy anode. Now, it is known that the thickness of the oxide layer which is formed in the course of an anodic oxidizing operation decreases at protruding points. The levelling of the surface to be oxidized in the course of the oxidation would thus make it possible to obtain an oxide layer of more regular thickness over the whole of the anode. This interpretation is confirmed by the improvements brought about by the invention in the performances of the capacitor.

The two-step oxidation according to the present invention is advantageously utilized in production and does not involve any additional cost if, in accordance with the preferred embodiment, the pre-oxidation and the washing are carried out on the anodes in batch

BRIEF DESCRIPTION OF THE DRAWINGS

The invention will be readily understood from the following description and by reference to the accompanying figures which are given by way of non limiting illustration of the invention and in which.

DETAILED DESCRIPTION

Figures 1, 2:
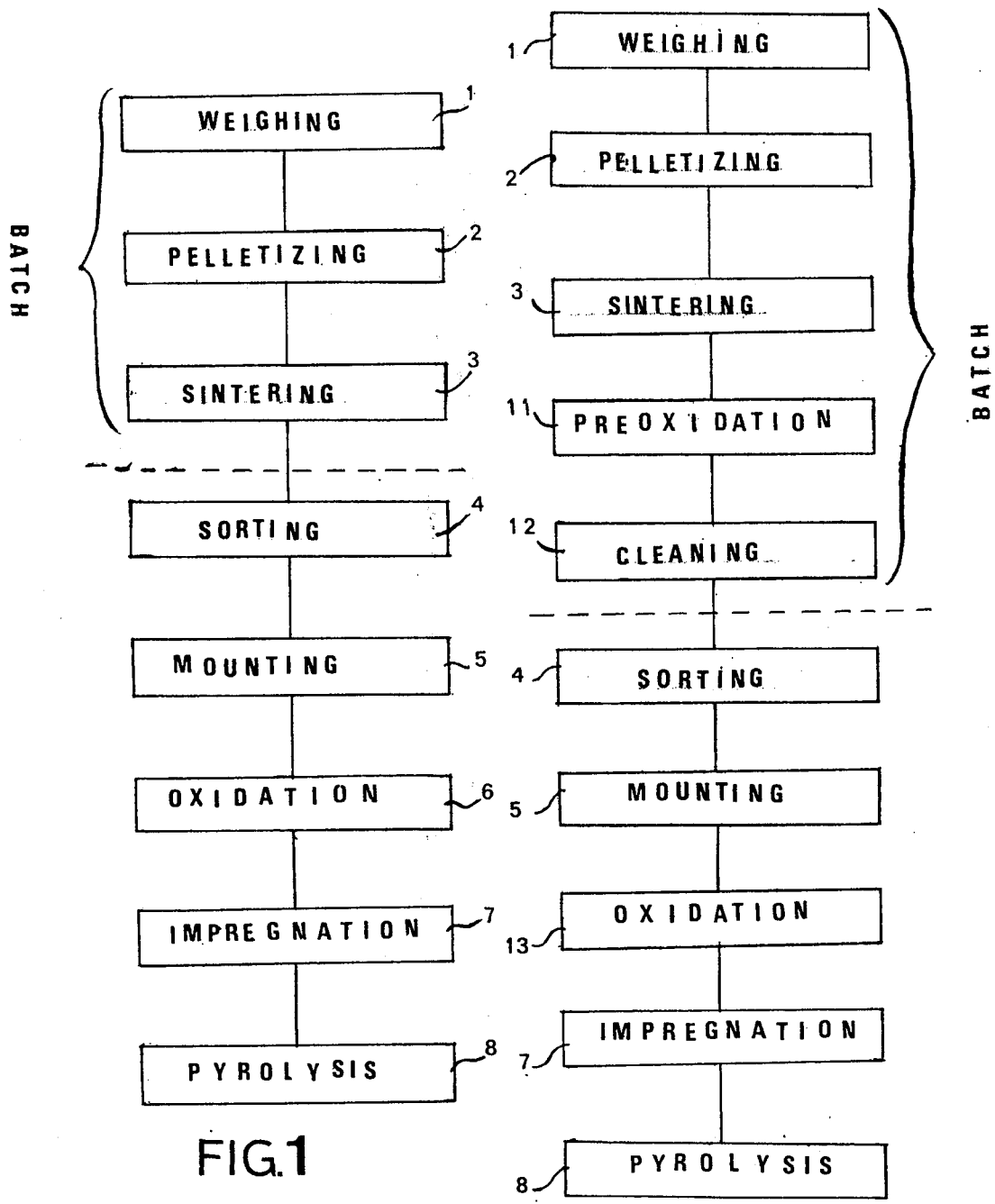
FIGS. 1 and 2 are diagrams illustrating the operations for the production of the anodes of tantalum solid electrolyte capacitors according to the prior art and according to the invention, respectively.

FIG. 1 shows the various operating steps in the manufacture of capacitors according to the prior art. There are shown at 1, 2 and 3 respectively the operations of powder weighing and pelletizing and sintering of the anodes. These three operations are carried out on anodes in batch, that is to say, they do not necessitate any individual handling of the anodes by the operators. The sintering phase 3 is followed by an operation 4 in which the individual anodes are sorted so as to be mounted on a belt or any other support (operation 5) for introducing them into the anodic oxidation tanks. The anodes thus mounted are then oxidized (operation 6) and are thereafter impregnated (operation 7) with manganese salt converted into dioxide in the course of the pyrolysis (operation 8). As is well known, operations, 6, 7 and 8 must be repeated a number of times before the anode is ready to receive the conductive coating serving as the cathode. The manufacture is completed by an encapsulating operation.

FIG. 2 sets out the various steps of manufacture of a capacitor according to the present invention, the steps which are identical with steps of the prior art bear the same reference numeral as in FIG. 1. After the sintering 3, a batch of anodes issuing from the furnace is subjected to a pre-oxidizing operation 11 followed by washing in acid medium 12. It is only at this step that the anodes are manually sorted (operation 4) and mounted (operation 5) before being subjected to a second oxidation (operation 13). The impregnation and pyrolysis (stages 7 and 8 respectively) and the other subsequent manufacturing steps are identical with the corresponding steps in the process of manufacture of the prior art. Comparison of FIGS. 1 and 2 clearly shows that the present invention makes it possible to step back the sorting stage 4 in the operating procedure which is a considerable advantage from the industrial viewpoint. Since the sorting of the anodes takes place later, the overall manufacturing output can be improved.

Operation 11 in which the anodes are pre-oxidized in bulk is carried out by dipping the baskets or other receptacles containing the sintered batch into a standard anodic oxidizing bath. This is continued until a uniform colour is obtained on all the anodes. The electrical conductivity between the anodes contained in bulk in the receptacle is ensured by the contact of the anodes with the receptacle on the one hand and the contact between the anodes on the other hand.

The oxidizing conditions of steps 11 and 13 are identical to those which govern the single oxidation step 6 of the prior art. In other words, the electrolyte concentrations, the law of variation of the oxidation current and the temperature and time conditions are those used in the manufacturing procedure according to the prior art for a given type of capacitor. The rate at which the oxide layer grows is a well known phenomenon which is controlled by the oxidizing conditions. As is apparent from FIG. 3, the oxidizing stage 11 is interrupted when the thickness of oxide formed reaches, for example, one half of the total thickness, that is to say, when the voltage levels off after the corresponding duration.

The acid washing operation 12 is carried out by immersing the basket containing the anodes in bulk in the acid bath which is formed of equal volumes of sulphuric and nitric acids to which there are added a half volume of hydrofluoric acid and three volumes of water. The washing is relatively short and its duration does not exceed one minute. By way of example, the capacitors whose characteristics are given in FIG. 4 have undergone an acid cleaning of a duration in the neighbourhood of thirty seconds. After the acid cleaning, it is preferable to subject the anodes to rinsing in water, the bath being at least partially agitated by ultra-sound. The anodes are thereafter carefully washed, first in a slightly alkaline solution intended to neutralize the residual acid traces, and then in a neutral solution, preferably deionized water.

Figure 3:
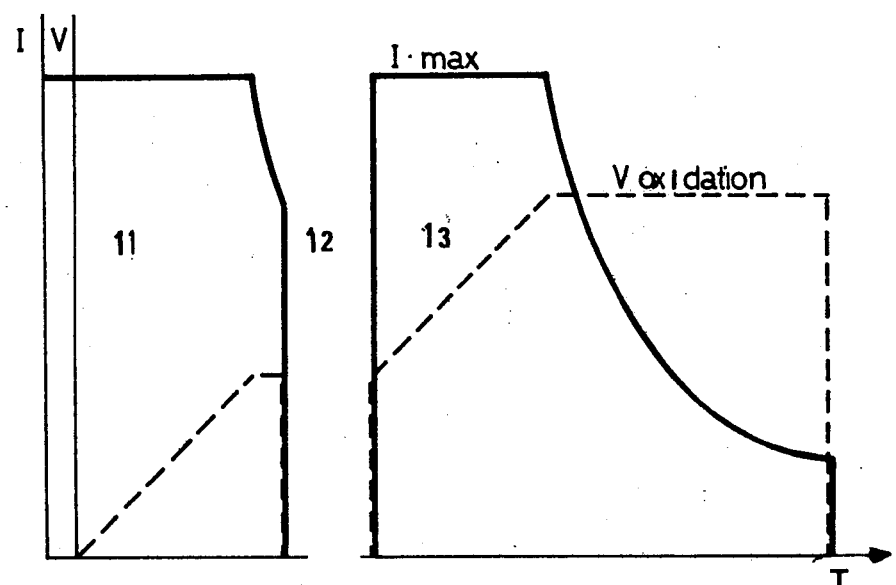
FIG. 3 is a curve illustrating the variations of the oxidation current as a function of time.

The batch of anodes is thereafter sorted for the purpose of mounting on bars of anodes which have been recognized as good, that is to say, not deformed or faulted in accordance with prior art mode of sorting. The anodes mounted on the bars are thereafter subjected (stage 5) to a further oxidation 13. The capacitors on their bars are therefore reintroduced into the oxidizing bath. As is shown by the curves of FIG. 3, the current applied to the electrolytic cell has the same maximum value as that reached at the end of phase 11. The level stage is maintained for the period necessary for producing an oxide layer of the desired thickness. As is shown by the chain-lined curve, the oxidation voltage does not return immediately on application of the current to the value reached at the end of stage 11. This means that the intermediate cleaning step 12 has in fact modified the oxide layer formed in the course of stage 11.

Figure 4:
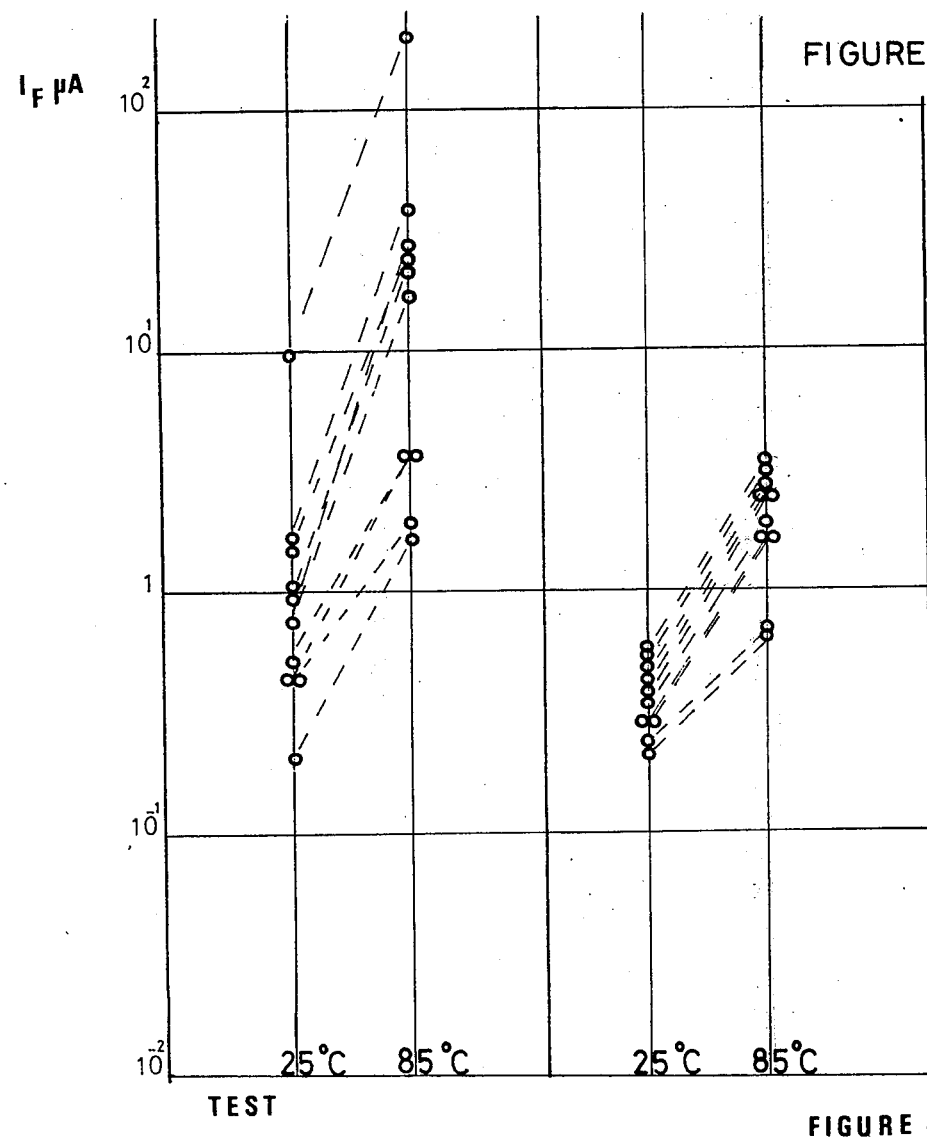
FIG. 4 illustrates the leakage current values measured on small series of identical capacitors produced in accordance with the prior art (curve 3) and in accordance with the invention.

FIG. 4 illustrates the values of the leakage currents of a set of test capacitors to the left and of a set of capacitors whose anodes have been treated in accordance with the invention to the right, respectively. The leakage current measurements were made at 25° and 85° C. respectively. The capacitors of the two groups are absolutely identical. Since steps 1, 2 and 3 are common, the test capacitors undergo a single oxidation 4 while the capacitors according to the invention undergo oxidation in two steps separated by an acid cleaning (stages 11, 12 and 13). The anodes are then again submitted to the same production steps until the complete capacitors are obtained. It will be seen that the capacitors whose anodes are treated in accordance with the invention have much more closely grouped characteristics then capacitors produced in accordance with the prior art, the leakage currents at 25° C. of the capacitors according to the invention being grouped between $1 . 10^{-1}$ and $3 . 10^{-1}$ $\mu A$, while the leakage current range of the capacitors according to the prior art stretches from $1 . 10^{-1}$ to 5 $\mu A$. The same grouping is to be found in the case of the leakage currents at 85° C. It will also be observed that the slope of the line joining the value of the leakage current at 25° C. to that of the leakage current at 85° C. is much less steep for the capacitors according to the invention than for the capacitors of the prior art. If the best capacitor is taken from each group, it will be seen that the current variation as a function of temperature in the case of the capacitors according to the invention is from 0.1 $\mu A$ to 0.3 $\mu A$ while in the case of the capacitor manufactured in accordance with the prior art the leakage current varies from 0.1 $\mu A$ to 0.8 $\mu A$ under the same conditions.

Figure 5:
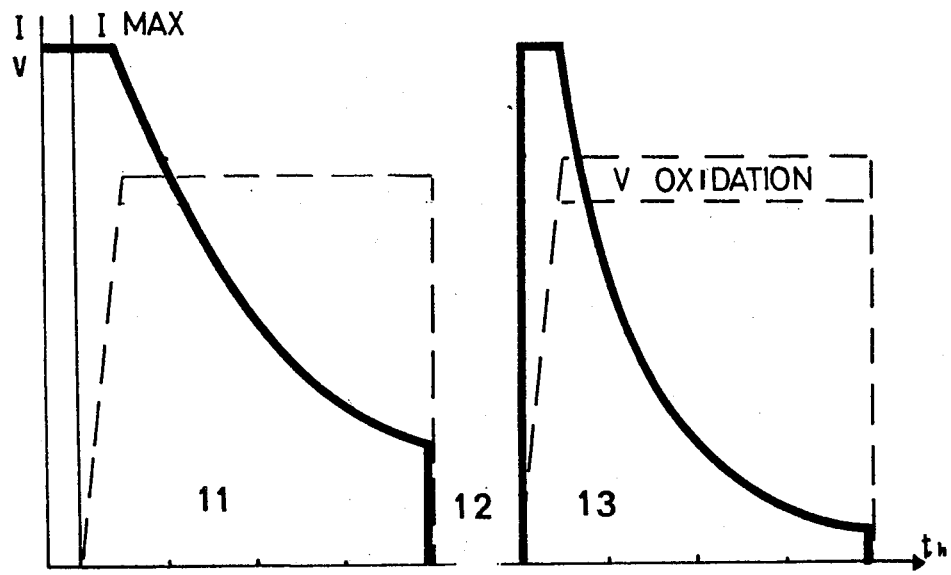
FIG. 5 is a curve illustrating the preferred oxidation current and voltage variations in the course of time.

FIG. 5 illustrates as a function of time a preferred law of variation of the oxidation voltage and of the oxidation current in the course of operations 11 and 13. It will be seen that the pre-oxidation (stage 11) is commenced with the maximum value of the current (thick-lined curve), the voltage (chain-lined curve) increasing in proportion as the oxide is formed. Thereafter, the current is reached at constant voltage when the latter has reached the maximum value ($\pm 10\%$), taking into account the maximum current passing through the bath containing the anodes in bulk.

The acid cleaning 12 is carried out in a solution of which the bath consists of a mixture of sulphuric, nitric and hydrofluoric acids, as described in the foregoing. This treatment is continued for a period of about thirty seconds. It is followed by immersion of the basket in a solution of the same composition as the preceding one in a concentration of 1% of the latter. This treatment is continued for one minute in the presence of ultra-sound. As already specified, the batch of anodes is thereafter dipped into an ammoniacal neutralizing bath for one minute in the presence of ultra-sound. The anodes are then washed for four or five minutes in deionized water in the presence of ultra-sound and then dried at 60° C.

The anodes are then sorted and mounted on the oxidation bars.

The oxidation stage (13) commences with the maximum value of the current used in the course of operation 11. The voltage across the terminals of the bath containing anodes mounted on bars is in the neighbourhood of the voltage of the level run reached in the course of the pre-oxidizing stage (at $\pm 10\%$). The bracket of the voltage values during operation 13 is represented in FIG. 5 by the horizontal double chain line. The absolute values of the voltage and current employed depend upon the type of capacitor produced and more particularly upon the rated voltage.

Figure 6:
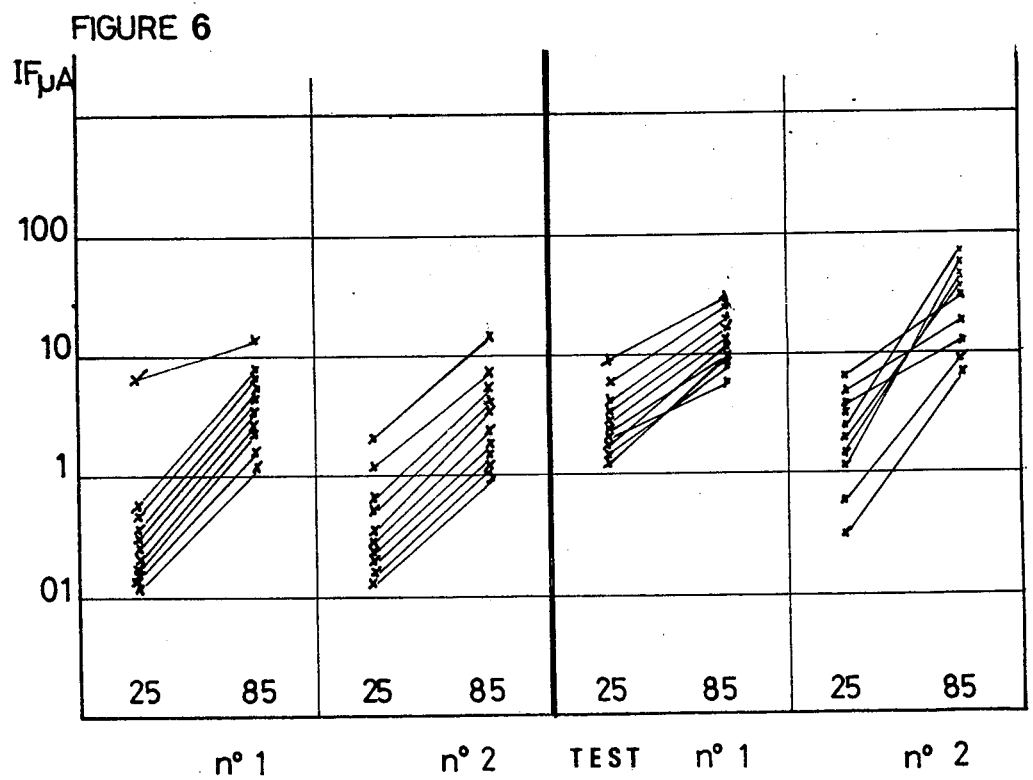
FIG. 6 illustrates characteristics of capacitors produced by application of the invention (curve 5)

FIG. 6 comprises four graphic diagrams grouping the results of the measurement of the forward leakage current at 25° C. and 85° C. respectively for two groups of capacitors constructed by the operating procedure of FIG. 5 (case No. 1 and case No. 2) in the case of the left-hand diagrams and for two groups of test capacitors associated with each of the groups (controls Nos. 1 and 2) in the case of the right-hand diagrams. By "test capacitors" are meant capacitors constructed in accordance with the prior art. The steps common to the prior art and to the invention being the same for both groups. It is clearly apparent that the leakage current values of the test capacitors is higher than that of the capacitors produced in accordance with the invention. This difference in behaviour will become more clearly apparent on examination of FIGS. 7 and 8.

Figure 7:
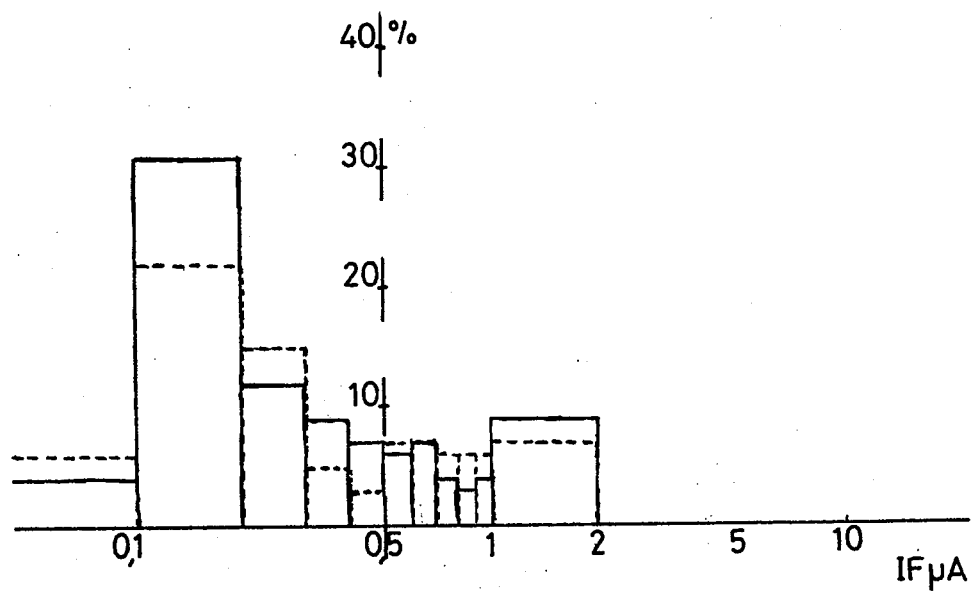
FIGS. 7 and 8 are histograms of the production according to the invention (curve 5) and according to the prior art respectively.
Figure 8:
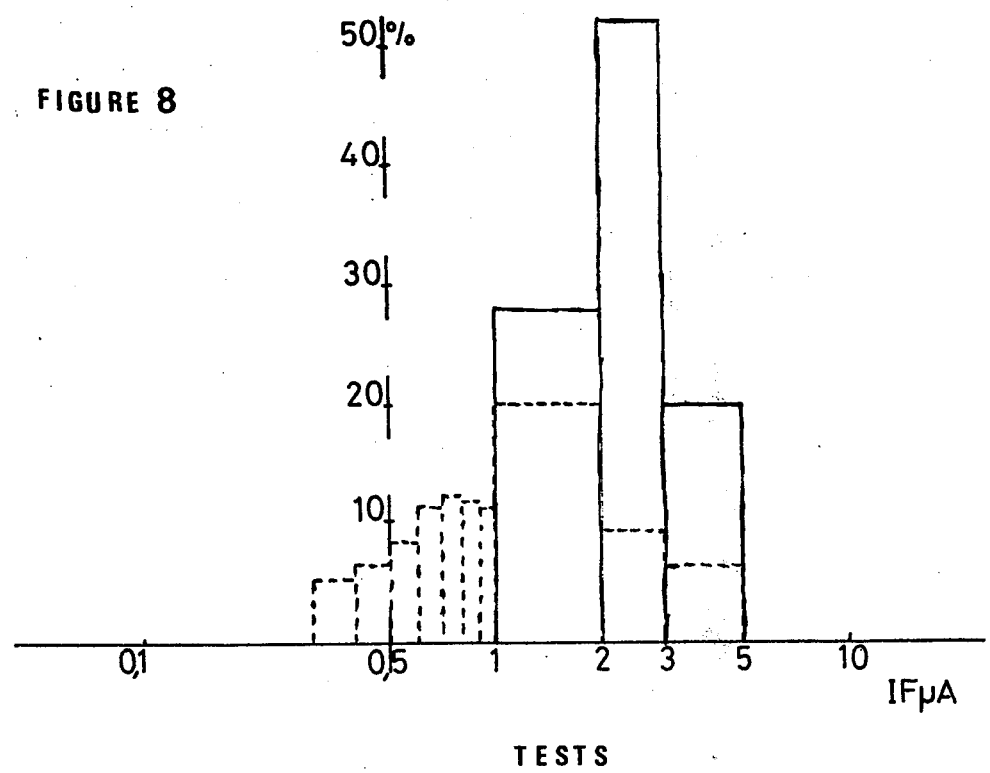

FIGS. 7 and 8 are histograms illustrating the distribution of the number of individual capacitors as a function of the forward leakage current for two different groups of capacitors shown in solid lines and in chain lines respectively. FIG. 7 corresponds to capacitors manufactured in accordance with the process shown in FIG. 5 and FIG. 8 to test elements associated with each group as defined in the foregoing. Comparison of these two diagrams makes it abundantly clear that the capacitors produced in accordance with the invention have lower leakage currents than the test capacitors. More than 50% of the test capacitors of one of the groups have leakage currents between 2 and 3 microamperes while no capacitor of either of the two groups produced in accordance with the invention has a leakage current above 2 microamperes. Most capacitors produced in accordance with the invention have leakage currents between 0.1 and 0.2 microampere while no test capacitor has a leakage current lower than 0.3 microampere in the case of one of the groups and 1 microampere in the case of the other. The capacitors whose curves are referred to in the foregoing are low-voltage capacitors whose charge is equal to 2000 microcoulombs for which the maximum leakage current is fixed at about 20 microamperes by the standard CCTU 02 12 B.

What we claim:

1. A method for anodically oxidizing sintered anodes for tantalum capacitors comprising:
    first anodizing the anodes in an electrolytic cell to form thereon an oxide layer that is a fraction of the thickness required in the final anode,
    cleaning the anodes by immersion in an acid bath consisting of an aqueous solution of effective amounts of nitric, sulfuric and hydrofluoric acids,
    removing the anodes from said bath and rinsing them to neutralize any acid remaining from said bath,
    further anodizing the anodes in an electrolytic cell until the oxide layer thereon has reached the required thickness.

2. The method of claim 1 wherein said acid bath is formed of about equal volumes of sulfuric and nitric acids to which there are added about half a volume of hydrofluoric acid and about three volumes of water.

3. The method of claim 1 wherein said first anodizing step is carried out until the thickness of said oxide layer is about half the required thickness.

4. The method of claim 1 wherein said further anodizing step is initiated at the current at which said first anodizing step is terminated.

5. The method of claim 1 wherein said further anodizing step is initiated at the same voltage at which said first anodizing step is terminated.

6. The method of claim 1 wherein cleaning comprises immersing said anodes successively in two baths which differ only in the fact that the second bath concentration is about one percent of the first bath concentration.

7. The method of claim 1 wherein said rinsing is carried out with ultrasonic agitation of an ammoniacal bath followed by a rinsing in deionized water.

8. A method of anodically oxidizing sintered anodes for tantalum capacitors comprising:
    first anodizing a batch of anodes in an electrolytic cell to form thereon an oxide layer that is a fraction of the thickness required in the final anode,
    cleaning said batch of anodes by immersion in an acid bath consisting of an aqueous solution of effective amounts of nitric, sulfuric and hydrofluoric acids,
    removing said batch of anodes from said acid bath and rinsing them to neutralize any acid remaining from said bath,
    sorting said anodes individually,
    mounting the individual anodes on electrical carrying bars,
    further anodizing the mounted anodes in an electrolytic cell until the oxide layer thereon has reached the required thickness.

* * * * *